(12) United States Patent
Tanno

(10) Patent No.: US 6,419,411 B1
(45) Date of Patent: Jul. 16, 2002

(54) SHEET CONVEYING APPARATUS AND RECORDING APPARATUS USING ELECTROSTATIC ATTRACTION

(75) Inventor: Koichi Tanno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/399,814

(22) Filed: Sep. 21, 1999

(30) Foreign Application Priority Data

Sep. 22, 1998 (JP) .............................................. 10-267825

(51) Int. Cl.[7] .......................... B41J 13/08; B65H 29/16; B65G 15/58
(52) U.S. Cl. ....................... 400/635; 271/193; 198/691; 400/634
(58) Field of Search ................................. 400/635, 634; 271/193; 198/691

(56) References Cited

U.S. PATENT DOCUMENTS

| | | | | |
|---|---|---|---|---|
| 4,244,465 A | * | 1/1981 | Hishikawa et al. | ......... 271/193 |
| 5,280,308 A | * | 1/1994 | Takahashi et al. | .......... 271/275 |
| 5,531,436 A | * | 7/1996 | Ohyama et al. | ............. 271/275 |
| 5,774,153 A | * | 6/1998 | Kuehnle et al. | ............. 347/129 |
| 5,896,148 A | * | 4/1999 | Fukushima et al. | ........... 347/67 |

\* cited by examiner

*Primary Examiner*—Daniel J. Colilla
(74) *Attorney, Agent, or Firm*—Fitzpatrick, Cella, Harper & Scinto

(57) ABSTRACT

The present invention relates to a sheet conveying apparatus comprising a conveyance belt for supporting and conveying a sheet, an attraction force generating device for electrostatically attracting the sheet, a voltage supplying device for supplying voltage to a voltage receiving portion of an electrode of the attraction force generating means formed at a side edge with respect to a moving direction of the conveyance belt and a protection member formed at a side edge with respect to a moving direction of the conveyance belt for isolating the voltage receiving portion of the electrode of the attraction force generating device from an exterior by covering the entire side edge of the conveyance belt.

19 Claims, 14 Drawing Sheets

SHEET CONVEYING APPARATUS AND RECORDING APPARATUS USING ELECTROSTATIC ATTRACTION

BACKGROUND OF THE INVENTION

1. Field of the Invention

This invention relates to a sheet conveying apparatus using a conveyance belt and a recording apparatus incorporating this sheet conveying apparatus and, more particularly, to a sheet conveying apparatus for electrostatically attracting and conveying a recording medium on which images are recorded with recording head in an ink-jet recording apparatus.

2. Description of Related Art

Generally, an ink-jet recording apparatus effects recording by discharging ink onto a recording medium such as paper or a synthetic resin and has advantages such as the recording head can be easily made compact, high resolution images can be recorded with high speed, the running cost can be made inexpensive, the apparatus creates low noise because of its non-impact nature, and color images can be easily recorded using multicolor inks. Particularly, a full-line type apparatus using a line type recording head having multiple orifices arranged in a width direction of the recording medium can record at a higher speed.

With a full-line type apparatus, however, because a distance between a recording head located at the most upstream position and a recording head located at the most downstream position becomes longer, the recording medium may float at the recording area, thereby irregularly forming the recording images, as well as possibly causing paper jamming or the like. Therefore, it is required to pull the recording medium downward so that the recording medium does not float. A method has been known in which conductive electrodes as urging means are provided, to which electric charges are applied to generate electrostatic force, thereby adhering the recording medium made of dielectric material.

In such an ink-jet recording apparatus, the recording medium fed by a feeding apparatus is held to a top surface of the conveyance belt by means of the electrostatic adhering or attracting means formed in the conveyance belt in a recording area for the recording head, and the recording medium is conveyed by the conveyance belt while being recorded by the recording head.

Referring to FIG. 11 to FIG. 14, an example of a conventional ink-jet recording apparatus is described. In FIG. 11, the recording sheet P as a recording medium is stacked on a feeding section 51 and fed sheet by sheet from the topmost sheet by a feeding roller 52.

The recording sheet P thus fed is adhered on a conveyance belt 56 having an adhering force generating means 55 as described below by a driven roller 53 and a pinch roller 54, and is conveyed to a recording starting position on a platen 58 by a conveyance belt 56 conveyed by a drive roller 57 driven by a pulse motor as a drive source.

The conveyance belt 56 is tensioned with the drive roller 57, the driven roller 53, and a pressure roller 59; one end of the pressure roller 59 is rotatively formed on the other end of an arm 60 formed in a rocking manner to the platen 58; and the arm 60 applies a tension to the conveyance belt 56 as it is pushed by a spring 61.

Numeral 62 is a full-line type recording head in which plural recording elements are arrayed across the whole width of the recording area of the recording sheet P. The recording heads 62 are placed with a prescribed interval in the order of 62K (black), 62C (cyan), 62M (magenta), and 62Y (yellow) and are mounted to a head holder 63.

FIG. 13 is a plan view of an adhering or attracting force generating means 55 viewed from the top side. In FIG. 13, the adhering force generating means 55 formed at the conveyance belt 56 is constituted of comb shaped electrode plates 64 and ground plates 65 made of a conductive metal in which respective teeth are independent from each other, and are disposed alternatingly in a direction perpendicular to the moving direction of the conveyance belt 56 as well as across the recording area of the recording heads 62.

Voltage receiving portions 64a, 65a exposing patterns at each edge with respect to the moving direction of the conveyance belt 56 are connected to the electrode plates 64 and the ground plates 65, and as shown in FIG. 12, voltage supplying brushes 66, 67 serving as voltage supplying means capable of contacting the voltage receiving portions 64a, 65a are provided over the voltage receiving portions 64a, 65a, and positive and negative voltages are fed to the electrode plates 64 via the voltage receiving portion 64a in contact with the voltage supplying brush 66, and the ground voltage is fed to the ground plates 65 via the voltage receiving portion 65a in contact with the voltage supplying brush 67.

FIG. 14 is a cross-section taken along section line XIV—XIV shown in FIG. 13 and shows a cross-section of the adhering force generating means 55 formed on the conveyance belt 56. As shown in FIG. 14, the adhering force generating means 55 is protected as the electrode plates 64 and the ground plates 65 are sandwiched by a base layer 56a and a surface layer 56b constituted of a synthetic resin such as polyethylene, polycarbonate, or the like.

With the above structure, the recording sheets P are attracted to an upper surface of the conveyance belt 56 by the attraction force generating means 55 and conveyed by the conveyance belt 56 while being recorded by the recording heads 62.

Numeral 68 is a cleaning roller pair for removing stains attached to the conveyance belt 56 and is provided in pressured contact with the conveyance belt 56. Numeral 69 is a delivery roller and is driven by rotative force of the drive roller 57 via a transmission means (not shown). Numeral 70 is a spur for pressing the delivery roller 69, and the recording sheet P after recording is nipped by the delivery roller 69 and the spur 70 and delivered to a delivery tray 71 to be contained. The spur 70 has a shape with sharp points such that the recorded image ink is not transferred because the spur 70 runs rotatively on the recording surface after recording.

However, according to the above prior art, because the voltage is fed by the voltage supplying brushes 66, 67 where the attraction force generating means 55 made of the comb shaped electrodes constituted of the electrode plates 64 and the ground plates 65 is provided on the conveyance belt 56 and where the voltage receiving portions 64a, 65a are formed as exposed externally on both sides with respect to the conveyance direction of the conveyance belt 56, inks unexpectedly discharged out of the recording heads 62, misted ink droplets (ink mist) made of satellites, micro dots, and the like caused by spraying inks, dusts, paper dusts, and so on may be easily attached to the voltage receiving portions 64a, 65a and the voltage supplying brushes 66, 67, and in such a situation, contact between the voltage receiving portions 64a, 65a and the voltage supplying brushes 66, 67 becomes unstable, thereby precluding supply of the feeding voltage.

It has been devised that a protection member be provided around the voltage supplying means to isolate it from external portions, but the proposed protection member does not have a structure such that the entire periphery of the conveyance belt is covered thereby, so that substantially the same problems as the above art may arise, such as inks and dusts being attached to the exposed voltage supplying portions.

This invention intends to solve the above problems. It is an object of the invention to provide a sheet conveying apparatus and a recording apparatus having this sheet conveying apparatus capable of protecting the entire voltage receiving portions from inks unexpectedly discharged out of the recording heads, misted ink droplets (ink mist) made of satellites, micro dots, and the like caused by spraying inks, dusts, paper dusts, and so on by covering the entire edges of a conveyance belt formed with the voltage receiving portions by a protection member in a manner so as to isolate these portions from the exterior, and of rendering stable contact between the voltage receiving portions and voltage supplying means to stabilize the supplying of voltage.

SUMMARY OF THE INVENTION

To accomplish the above object, a sheet conveying apparatus according to the invention includes attraction force generating means formed with electrodes for electrostatically adhering a sheet as a recording medium, a conveyance belt having voltage receiving portions to which a voltage is supplied at an edge or edges in a moving direction, and voltage supplying means for supplying a voltage to voltage receiving portions, and has a feature that the entire side edge or edges of the conveyance belt are covered by a protection member provided in contact with or placed adjacent to the conveyance belt so that the voltage receiving portions are isolated from the exterior with a prescribed interval at a periphery of the voltage receiving portion.

According to this structure, because the entire side edge or edges of the conveyance belt formed with the voltage receiving portions are covered by the protection member so as to be isolated from the exterior, the voltage receiving portions as a whole can be protected from inks unexpectedly discharged out of the recording heads, misted ink droplets (ink mist) made of satellites, micro dots, and the like caused by spraying inks, dusts, paper dusts, and so on, and stable voltage supply can be realized upon stable contact between the voltage receiving portions and voltage supplying means.

In such a sheet conveying apparatus, the attraction force generating means can be constituted of electrode plates and ground plates to which voltages different from one another are applied, wherein the electrode plates and the ground plates are arranged alternatingly; the voltage receiving portions of the electrode plates and the ground plates can be placed on the opposite edges of the conveyance belt with respect to the moving direction of the conveyance belt; and the protection member can be formed on each edge of the conveyance belt with respect to the moving direction of the conveyance belt for protecting the attracting force generating means.

Alternatively, in such a sheet conveying apparatus, the attracting force generating means can be constituted of electrode plates and ground plates to which voltages different from one another are applied; the electrode plates and the ground plates can be arranged alternatingly, wherein the voltage receiving portions of the electrode plates and the ground plates are placed on one edge of the conveyance belt with respect to the moving direction of the conveyance belt; and the protection member can be formed on the one edge of the conveyance belt at which the voltage receiving portions are placed with respect to the moving direction of the conveyance belt for protecting the attracting force generating means.

The attracting force generating means can be constituted of the electrode plates and the ground plates, which are in a strip shape, arranged alternatingly and in a comb shape such that their lengths run in a direction perpendicular to the moving direction of the conveyance belt.

The sheet conveying apparatus may have a structure with a sealing member attached to the protection member for sealing a space between the protection member and the conveyance belt by contacting an upper surface of the conveyance belt. According to this sheet conveying apparatus, this sealing member surely isolates the voltage receiving portions of the attracting force generating means from the exterior.

With such a sheet adhering conveying apparatus, where the voltage supplying means is supported by a part of the protection member, the apparatus can be free from adverse influence of inks from the recording means and dusts and can be formed with a reduced number of parts and reduced costs, because the voltage supplying means is also isolated from the exterior by the protection member.

The protection member may have a support for supporting the conveyance belt at a position facing the voltage supplying means through the conveyance belt, thereby surely contacting the voltage supplying means to the voltage receiving portion of the conveying means. It is also preferable that the support of the protection member is formed in a convex shape and that friction reducing means is provided between the support and the conveyance belt.

The sheet conveying apparatus may have a cleaning member for cleaning, in contact with the conveyance belt, the voltage receiving portion of the adhering force generating means on an upstream side of the voltage supplying means in the moving direction of the conveyance belt. With such a structure, the voltage receiving portions of the adhering force generating means are always cleaned in association with movement of the conveyance belt before contacting the voltage supplying means, so that both can be surely contacted. The protection member also serves as a bracket of the cleaning member, so that the number of parts and the costs can be reduced.

In the sheet adhering conveying apparatus thus described, the protection member may separably contact the conveyance belt. Particularly, where the protection member is attached to a jamming treatment door openable or detachable during paper jamming treatments of a jammed sheet, the protection member is contacted with and separated from the conveyance belt in association with movement of the jamming treatment door. The protection member, which would otherwise be an obstacle to maintenance on the conveyance belt, can be moved according to opening of the jamming treatment door, so that the conveying apparatus can afford ease of operation in jamming recovery.

In the sheet conveying apparatus, the conveyance belt can be wound around at least a drive roller and a driven roller and tensioned by at least one pressure roller.

In another aspect, a recording apparatus according to the invention includes a sheet conveying apparatus having: a conveyance belt for supporting and conveying a sheet; attracting force generating means formed in the conveyance belt having electrodes for electrostatically attracting the sheet; voltage supplying means for supplying a voltage to a voltage receiving portion as a part of an electrode of the attracting force generating means formed at a side edge with respect to a moving direction of the conveyance belt; and a protection member formed at a side edge with respect to the moving direction of the conveyance belt for isolating the voltage receiving portion in the electrode of the attracting force generating means from an exterior by covering the entire side edge of the conveyance belt in contact with or placed adjacent to the conveyance belt, and recording means arranged at a position facing the conveyance belt.

The recording means may eject droplets of ink from an orifice to effect recording on the sheet. Furthermore, the recording means can be provided in plural number in the moving direction of the conveyance belt and be so arranged that the orifices are aligned in a direction perpendicular to the moving direction of the conveyance belt. The recording means may also be a full line type recording head in which plural recording elements are arranged across the entire width of a recording area of the sheet.

With such a recording apparatus, the recording means may discharge ink from the orifice utilizing film boiling occurring in the ink by thermal energy applied by an electrothermal converter.

DETAILED DESCRIPTION OF THE PREFERRED EMBODIMENTS

Figure 1:
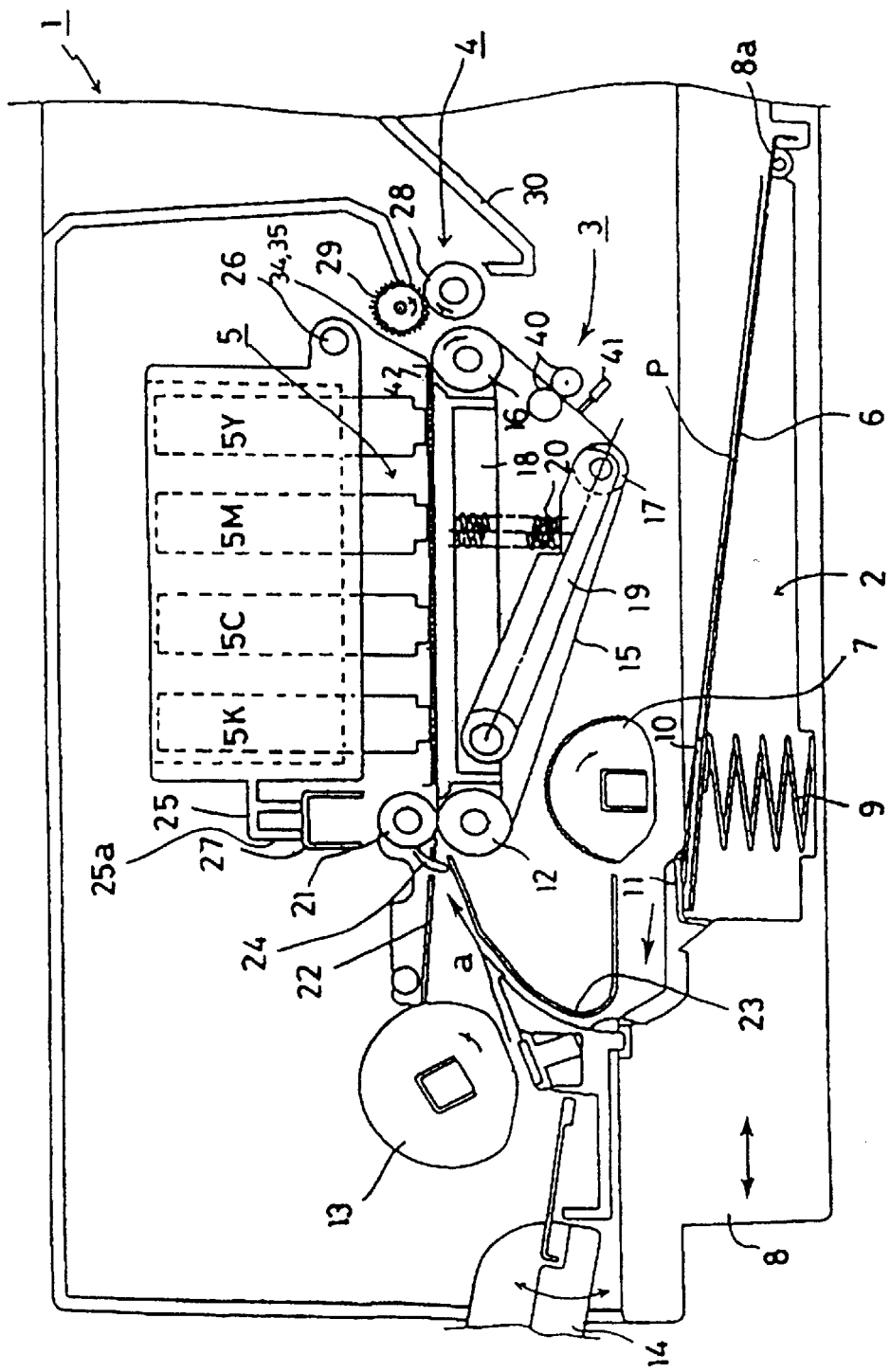
FIG. 1 is a cross-sectional illustration showing a structure of a recording apparatus having a sheet conveying apparatus according to the invention.
Figure 2:
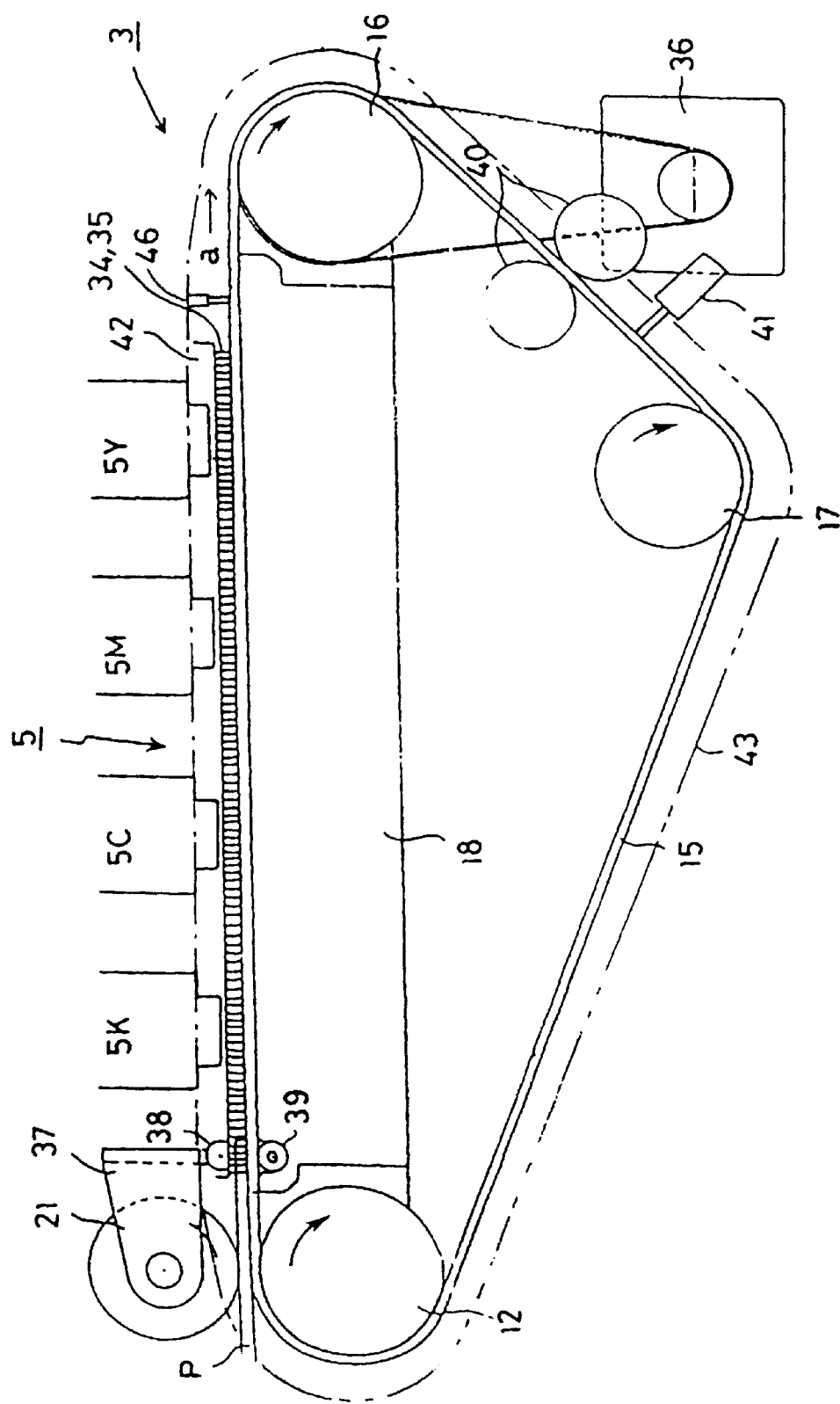
FIG. 2 is a cross-sectional illustration showing a structure of the first embodiment of the sheet conveying apparatus according to the invention.
Figure 3:
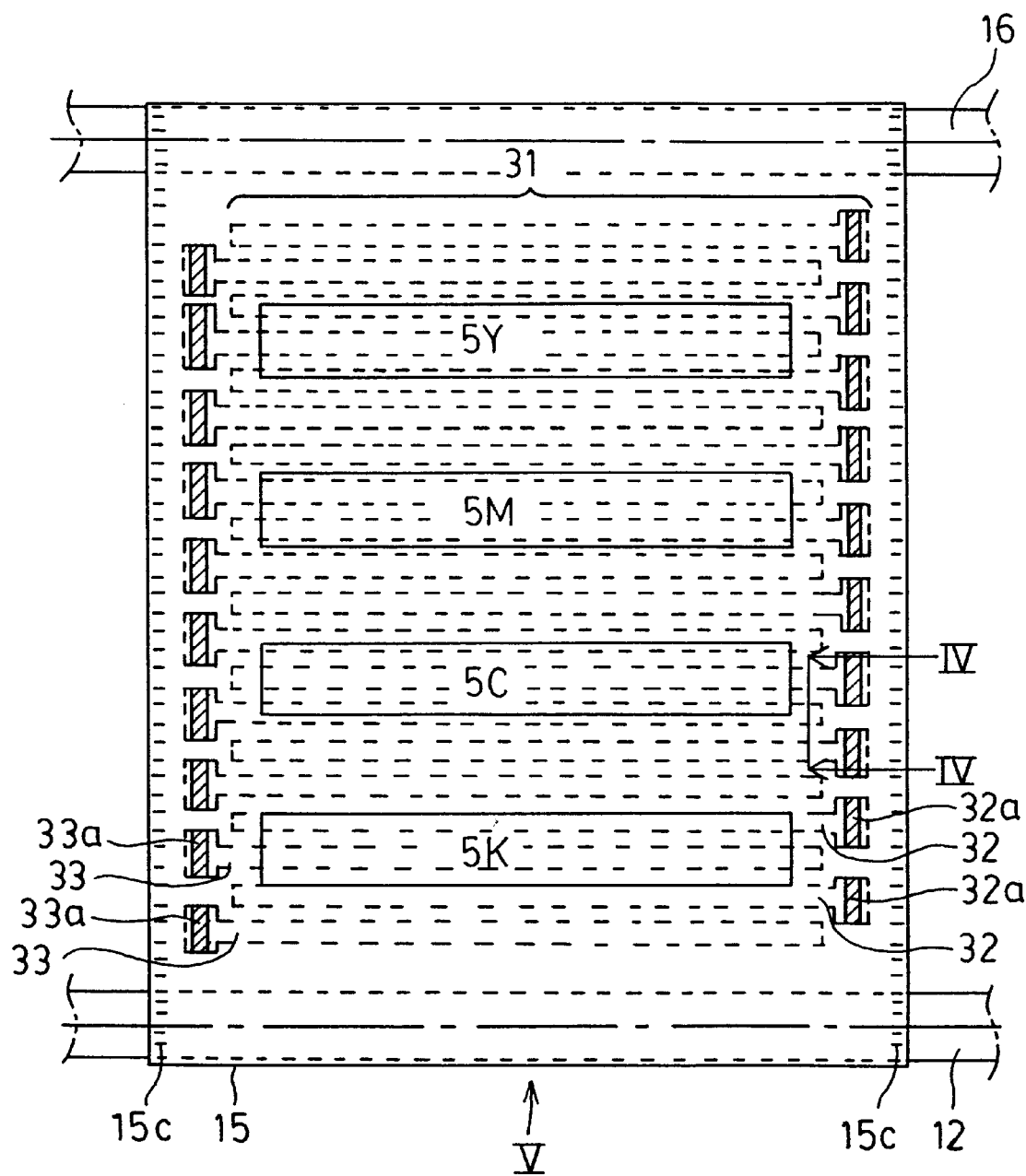
FIG. 3 is a plan illustration showing a structure of an attracting force generating means formed in a conveyance belt of the first embodiment.
Figure 4:
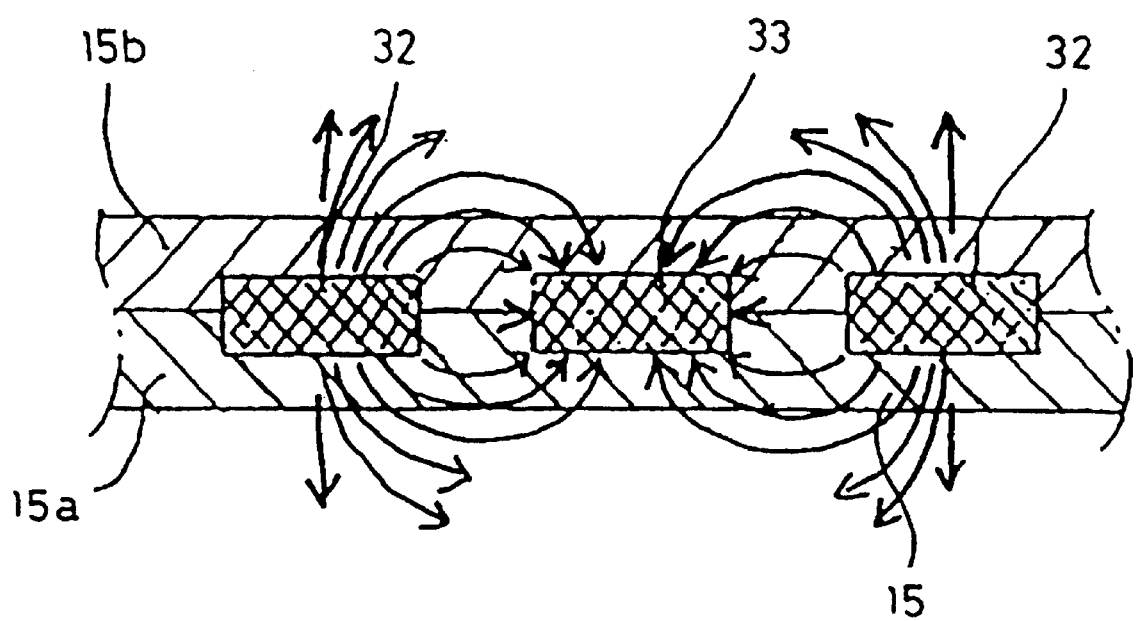
FIG. 4 is a cross-section taken along section line IV—IV in FIG. 3.
Figure 5:
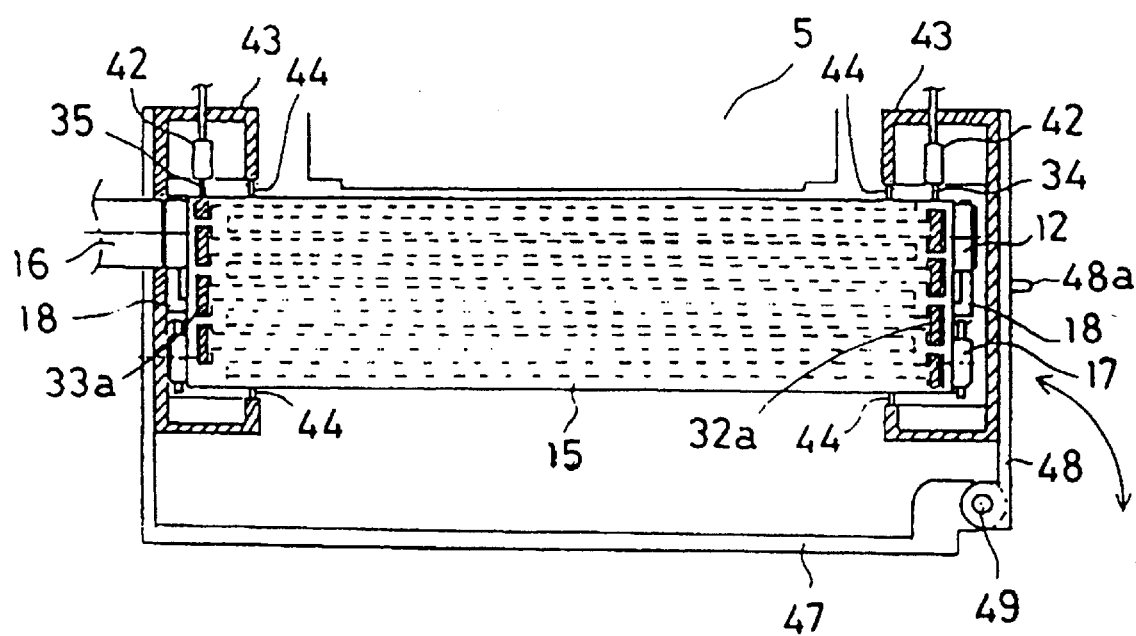
FIG. 5 is a view in a direction of arrow V in FIG. 3.
Figure 6:
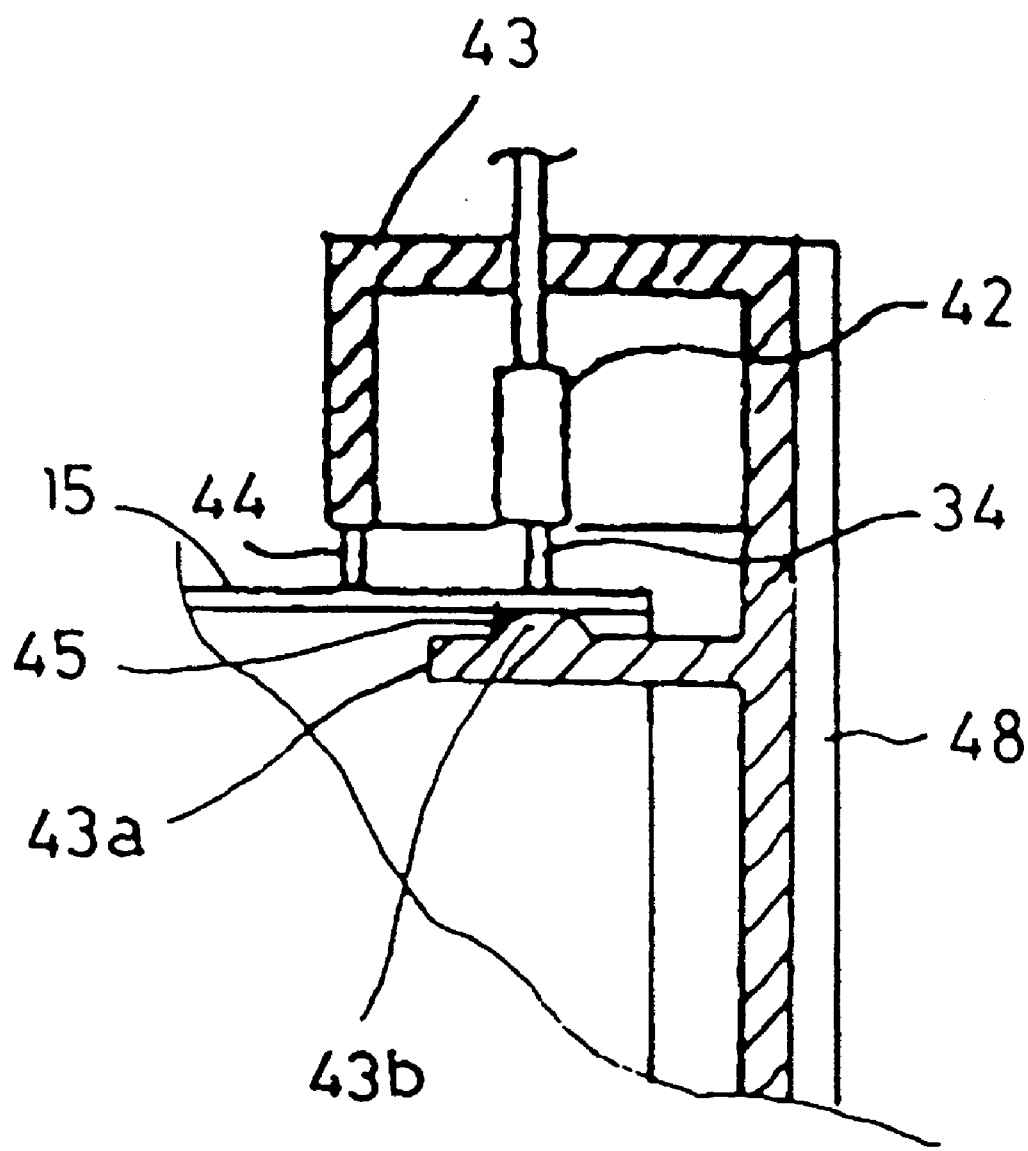
FIG. 6 is an enlarged view of a portion of FIG. 5.
Figure 7:
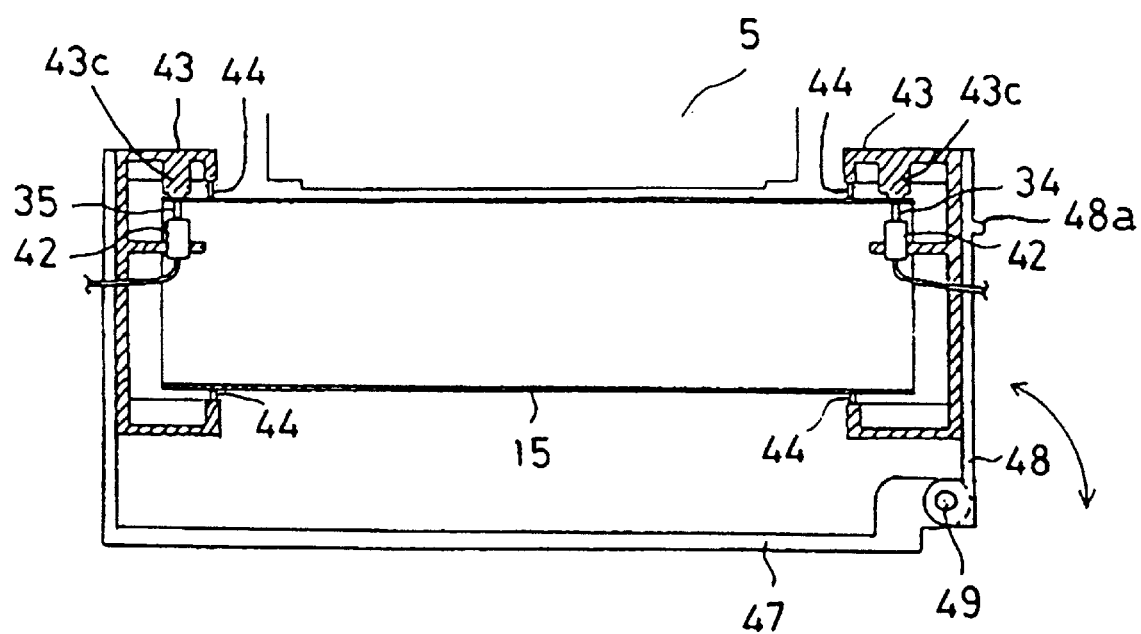
FIG. 7 is a view showing a structure of the second embodiment of a sheet conveying apparatus according to the invention.
Figure 8:
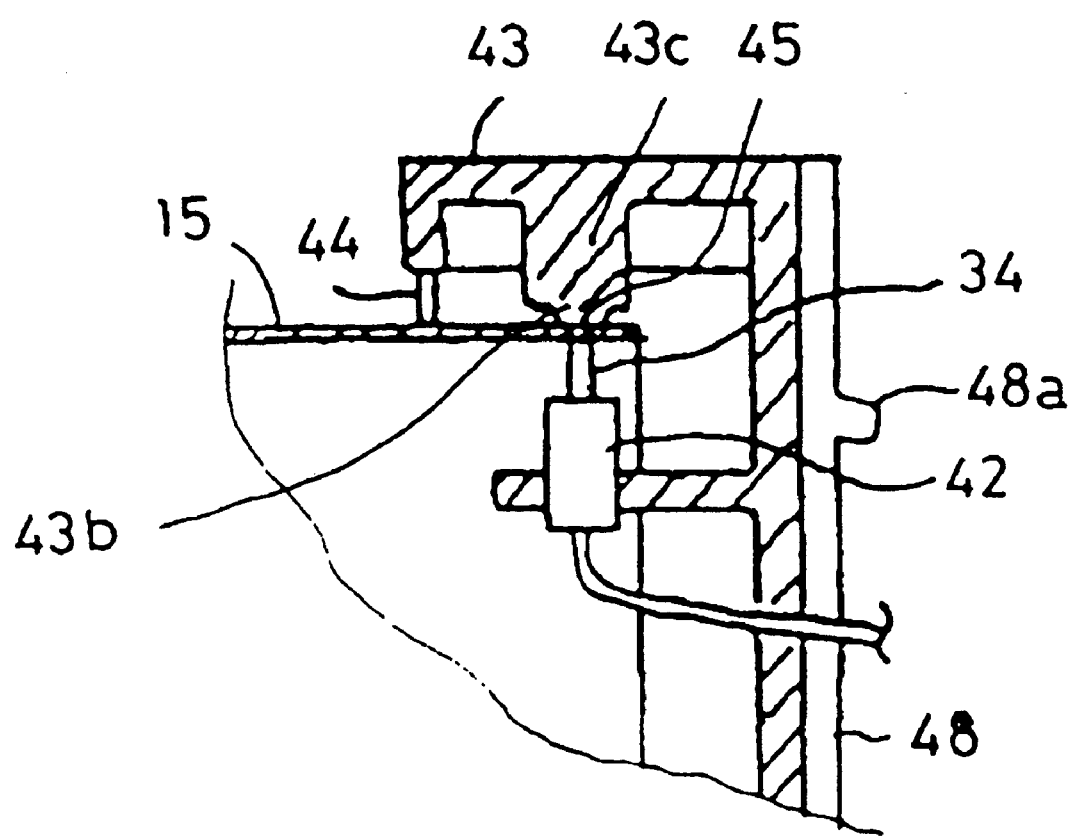
FIG. 8 is an enlarged view of a portion of FIG. 7.
Figure 9:
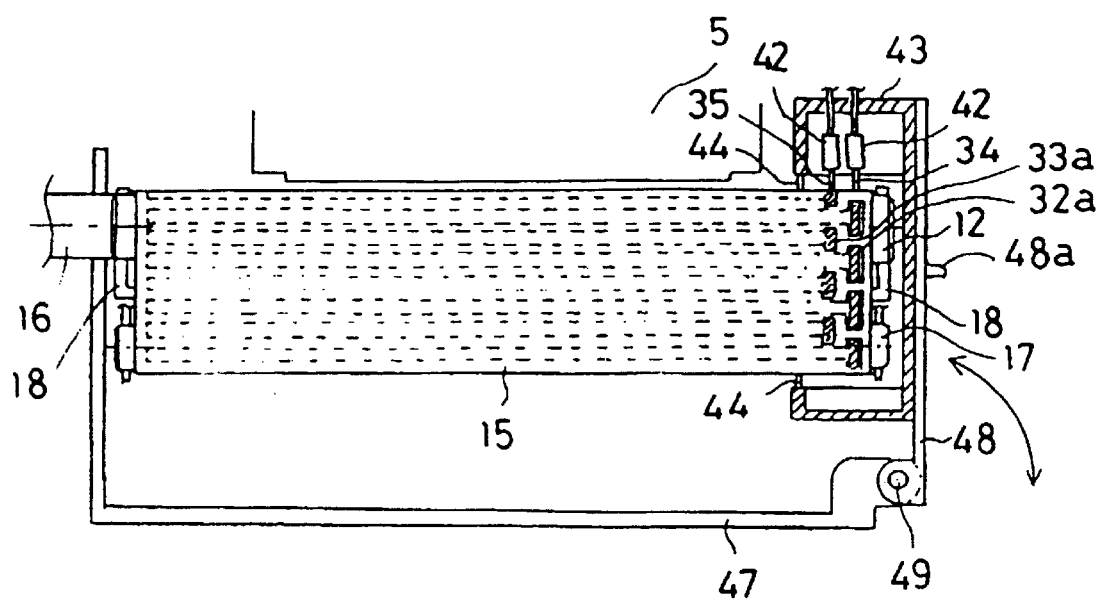
FIG. 9 is a view showing a structure of the third embodiment of a sheet conveying apparatus according to the invention.
Figure 10:
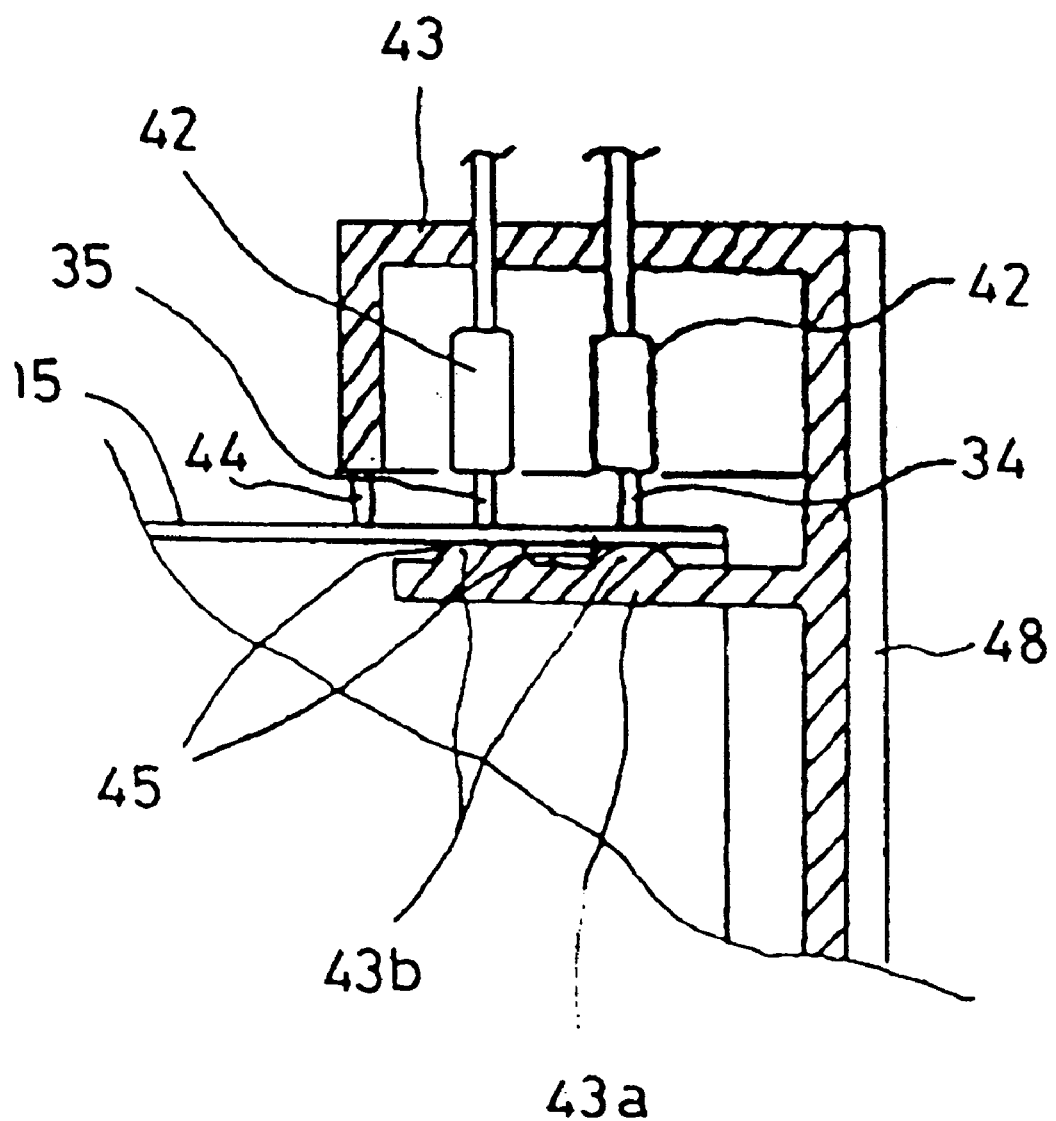
FIG. 10 is an enlarged view of a portion of FIG. 9.
Figure 11:
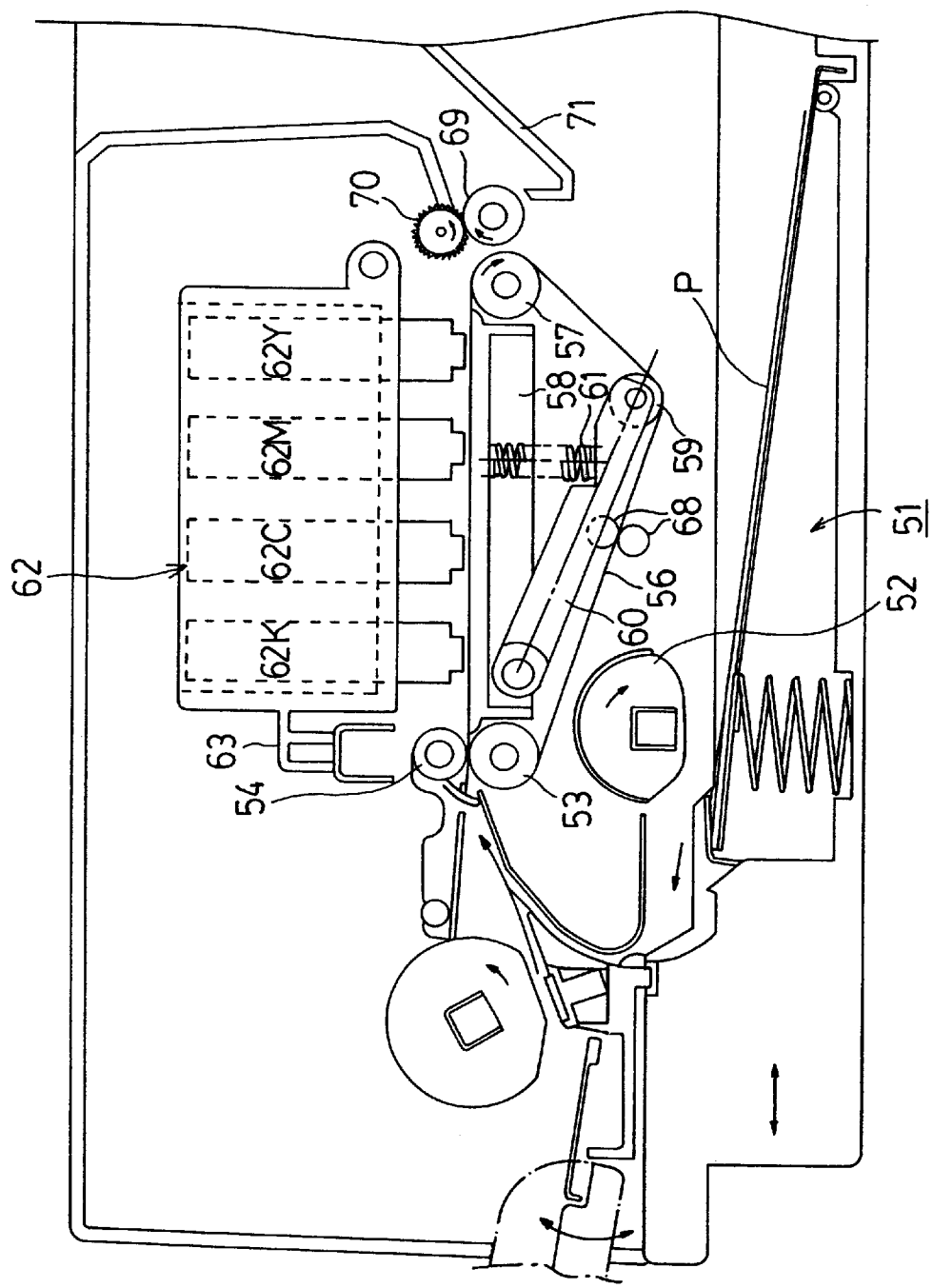
FIG. 11 is a view illustrating a prior art recording apparatus.
Figure 12:
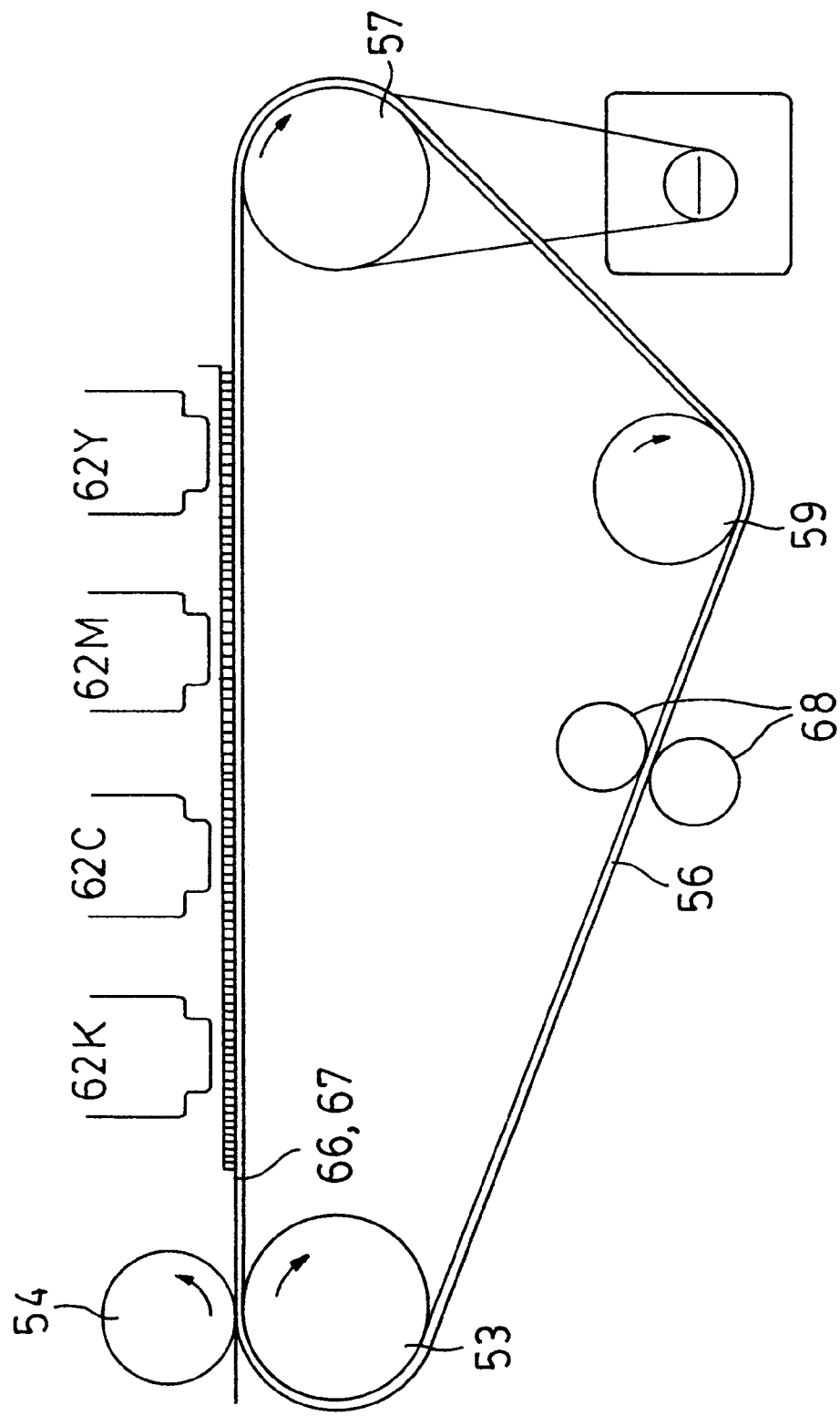
FIG. 12 is a view illustrating the prior art.
Figure 13:
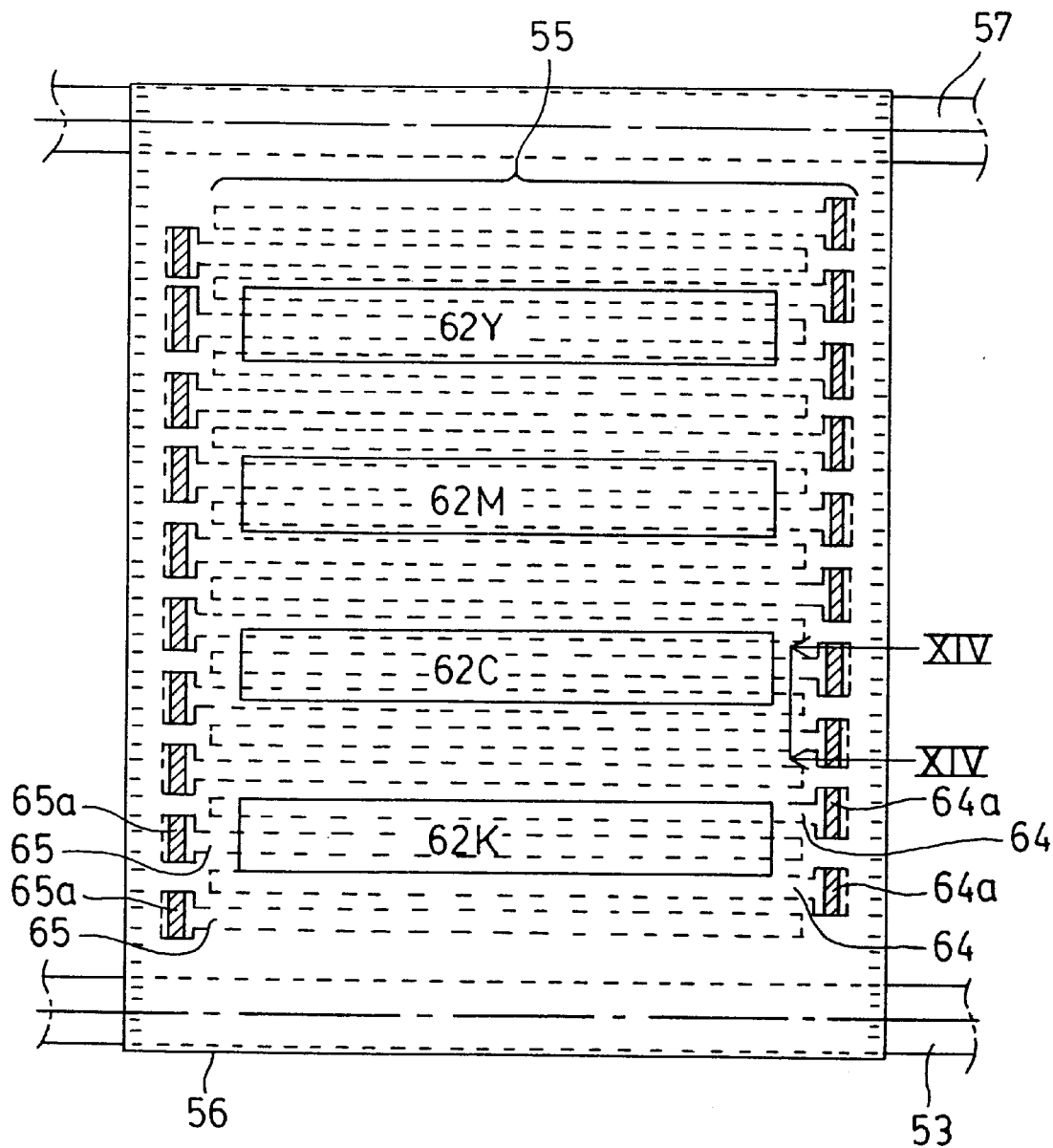
FIG. 13 is a view illustrating the prior art.
Figure 14:
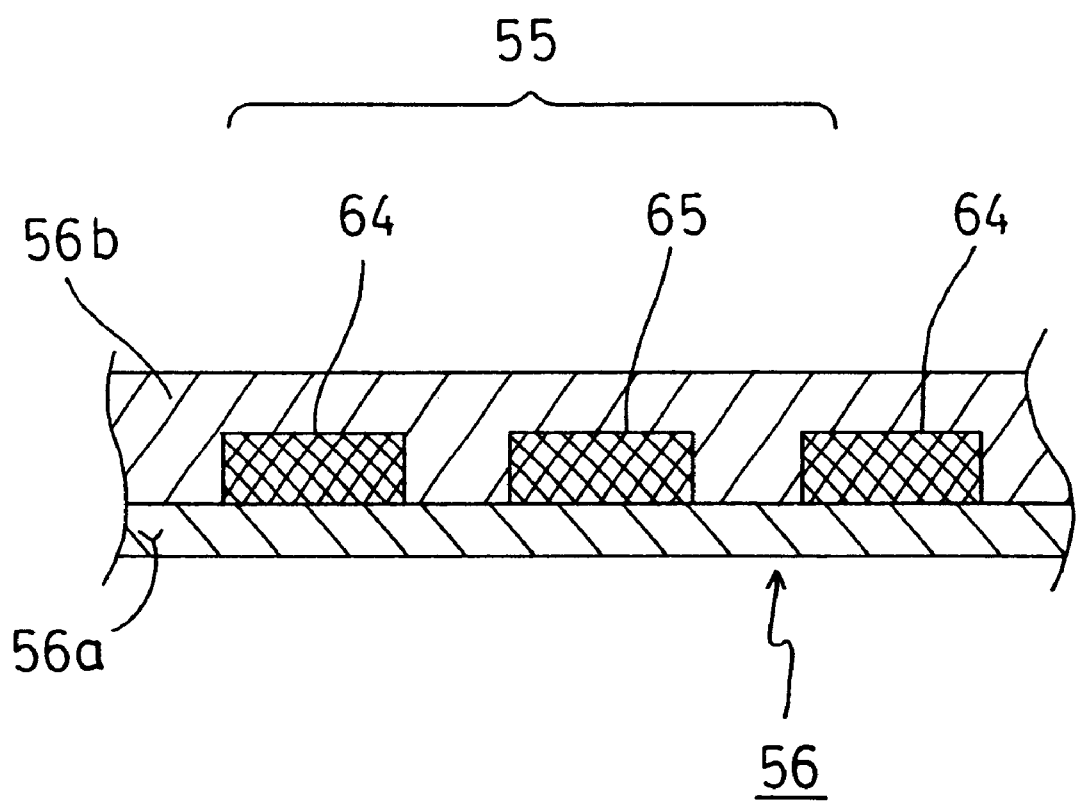
FIG. 14 is a view illustrating the prior art.

Referring to the drawings, an embodiment, as an example of a sheet conveying apparatus and a recording apparatus having this sheet conveying apparatus according to the invention, where the invention is applied to an ink-jet recording apparatus, is described in detail. FIG. 1 is a cross-sectional illustration showing a structure of a recording apparatus having a sheet conveying apparatus according to the invention; FIG. 2 is a cross-sectional illustration showing a structure of the first embodiment of the sheet conveying apparatus according to the invention; FIG. 3 is a plan illustration showing a structure of an attracting force generating means formed at a conveyance belt of the first embodiment; FIG. 4 is a cross-section taken along section line IV—IV in FIG. 3; FIG. 5 is a view in the direction of arrow V in FIG. 3; FIG. 6 is an enlarged view of a portion of FIG. 5; FIG. 7 is a view showing a structure of the second embodiment of a sheet conveying apparatus according to the invention; FIG. 8 is an enlarged view of a portion of FIG. 7; FIG. 9 is a view showing a structure of the third embodiment of a sheet conveying apparatus according to the invention; and FIG. 10 is an enlarged view of a portion of FIG. 9.

In FIG. 1, the recording apparatus 1 having an automatic feeding apparatus includes a feeding section 2, a conveyance section 3, a delivery section 4, and a recording section 5.

First, the structure of the feeding section 2 will be described. In the feeding section 2, a pushing plate 6 stacking recording sheets P serving as recording media made of a dielectric material such as paper or a synthetic resin and feeding rotary body 7 for feeding the recording sheets P are attached to a base 8, and the pushing plate 6 is pivotally movable around a rotation axis 8a connected to the base 8 and pushed by a pushing plate spring 9 toward the feeding rotary body 7.

A separation pad 10 made of a material having a high frictional coefficient, such as an artificial skin or the like, is placed on a position of the pushing plate 6 facing the feeding rotary body 7 to prevent more then one recording sheet P from being supplied at a time. On the base 8, further provided are a separation hook 11 covering a corner of the recording sheets P for separating the recording sheets P one by one, and a releasing cam, not shown, for disengaging contact between the pushing plate 6 and the feeding rotating body 7.

With this structure, during the standby mode, the releasing cam presses down the pushing plate 6 to a prescribed position, thereby disengaging the contact between the pushing plate 6 and the feeding rotary body 6. When a drive force from a conveyance roller 12, while in this state, is transmitted to the feeding rotary body 7 and the releasing cam through unshown gears or the like, the releasing cam separates from the pushing plate 6, making the pushing plate 6 move up and contacting the feeding rotary body 7 to the recording sheet P. The apparatus then starts feeding a recording sheet P upon picking up the recording sheet P along with the rotation of the feeding rotary body 7, thereby sending the recording sheet P to the conveyance section 3 where the separation hook 11 separates the recording sheets P one by one.

The feeding rotary body 7 continues rotating until the recording sheet P is sent to the conveyance section 3, and the apparatus again enters a standby mode in which the recording sheet P and the feeding rotary body 7 are disengaged to cut off the drive force from the conveyance roller 12.

Numeral 13 is a feeding rotary body for manual feeding and supplies a recording sheet P placed on a manual feeding tray 14 according to recording instruction signals of a computer up to the conveyance roller 12.

Next, the structure of the conveyance section 3 is described. The conveyance section 3 includes the conveyance belt 15 for conveying the recording sheet P using electrostatic adherence or attraction and a paper edge (PE) sensor (not shown). The conveyance belt 15 is driven by a driving roller 16, wound around a conveying roller 12 as a driven roller, and tensioned by a pressure roller 17.

The conveyance roller 12 and the driving roller 16 are mounted rotatively on a platen 18 facing recording heads 5K, 5C, 5M, 5Y serving as recording means, and one end of the pressure roller 17 is rotatively mounted to the other end of an arm 19 that is pivotally mounted on the platen 18. As the arm 19 is pressed by a spring 20, the conveyance belt 15 receives tension. The platen 18 is located below the conveyance belt 15 and serves to support the conveyance belt 15.

A pinch roller 21 driven by the conveyance belt 15 is positioned in contact with the conveyance belt 15 at a position facing to the conveyance roller 12. The pinch roller 21 is urged to the conveyance belt 15 by a spring (not shown), thereby introducing the recording sheets P to the recording section 5. An upper guide 22 and a lower guide 23 are formed for guiding the recording sheets P at an entrance of the conveyance section 3 to which the recording sheets P are conveyed.

A PE sensor lever 24 for transmitting an indication of passage of the front and rear ends of the recording sheets P to the PE sensor (not shown) is positioned at the upper guide 22. The recording heads 5K, 5C, 5M, 5Y as recording means for forming images based on image information are disposed at a downstream side of the conveyance roller 12 in the conveyance direction of the recording sheets P.

The recording sheets P sent to the conveyance section 3 with the above structure are guided by the upper guide 22 and the lower guide 23 to a roller pair comprised of the conveyance roller 12 and the pinch roller 21. At that time, the front end of the conveyed recording sheet P is detected by the PE sensor lever 24 to indicate the recording position of the recording sheet P. The recording sheet P is conveyed by rotation of the conveyance roller 12 via the drive roller 16 driven from a conveyance motor 36.

As shown in FIG. 2, a pushing roller 38 as a pushing means for pushing the recording sheets P toward the conveyance belt 15 is rotatively mounted to a support member 37 pivotally movable around a rotation axis of the pinch roller 21, and the pushing roller 38 is urged toward the conveyance belt 15 by an urging means (not shown).

A driven roller 39 driven by the conveyance belt 15 is rotatively mounted to the platen 18 at a position facing the pushing roller 38 through the conveyance belt 15. The driven roller 39 functions to reduce wear or frictional force when the lower surface of the conveyance belt 15 and the upper surface of the platen 18 are rubbed against each other, by pushing the conveyance belt 15 downward by the pushing roller 38.

Numeral 40 is a cleaning roller pair and is formed in pressed contact with the conveyance belt 15. The cleaning roller pair 40 is formed of a porous sponge incorporating tiny bubbles of diameters in a range of 10 microns to 30 microns capable of absorbing inks to remove stains such as inks or the like attached to the conveyance belt 15 for preventing the roller pair from deteriorating. The conveyance belt 15 is subject to removal of electron charges by a discharging brush 41 as a discharging means after being cleaned by the cleaning roller pair 40.

Next, the structure of the recording section is described. The recording heads 5K, 5C, 5M, 5Y according to the embodiment have orifices (nozzles) for ejecting droplets of inks at a position facing the conveyance belt 15 and are provided in plural number in the moving direction of the conveyance belt 15, and multiple nozzles are aligned in a direction perpendicular to the moving direction of the conveyance belt 15. In this embodiment, full line,type ink-jet recording heads are used in which plural recording elements are arrayed across the whole width of the recording area of the recording sheet P, and the recording heads are disposed with a prescribed interval in the order of 5K (black), 5C (cyan), 5M (magenta), 5Y (yellow) from an upstream side in the conveyance direction of the recording sheets P. The recording heads 5K, 5C, 5M, 5Y are attached to a head holder 25.

Those recording heads 5K, 5C, 5M, 5Y can supply heat to inks with a heater or the like. Inks are subject to film boiling by the heat, and pressure change created by growing and shrinking of bubbles caused by the film boiling makes the nozzles of the recording heads 5K, 5C, 5M, 5Y eject the inks, thereby forming images on the recording sheets P.

That is, the recording heads 5K, 5C, 5M, 5Y have fine orifices (liquid discharge openings), liquid passages, energy operating portions provided in respective liquid passages, and energy generating means for generating droplet forming energy to act on liquid in the energy operating portion.

As for the method of generating such energy, there are a recording method using an electromechanical converter such as a piezoelectric element, a recording method using energy generating means on which an electromagnetic wave such as a laser beam is radiated to effect heating which operates to discharge the droplets, a recording method using an energy generating means in which liquid is heated by an electrothermal converter such as a heat generating element having heat-generating resistors to eject liquid, or the like.

Among those methods, the recording head employing the ink-jet recording method to eject liquid by thermal energy can produce high resolution recordings because the orifices for forming discharged droplets for recording can be arrayed at a high density.

Among those recording heads, a recording head employing electrothermal converters as energy generating means is advantageous because the head is easier to be made compact, can fully utilize recent technological advancements in semiconductor technology and merits of IC technology and micro fabrication technology, whose reliability is remarkably improved, can easily make parts mountable at high density, and can reduce the production cost.

Although in the above mentioned embodiment, the ink-jet recording method is employed in the recording means, it is further desirable that the electrothermal converter is energized corresponding to a recording signal and that ink is discharged to effect recording from orifices by using the bubble growth and shrinkage created in the ink by film boiling in the ink produced by thermal energy applied from the electrothermal converter.

As far as the representative structures or principles concerned, it is also desirable to use fundamental principles, for example, as disclosed in the specifications of U.S. Pat. Nos. 4,723,129 and 4,740,796.

The recording heads 5K, 5C, 5M, 5Y have the structure whose one end is held rotatively by a shaft 26, and a projection 25a of the head holder 25 formed at the other end is engaged with a rail 26, thereby restricting a spaced distance between the respective nozzle surfaces of the recording heads 5K, 5C, 5M, 5Y and the recording sheets P.

Now, the structure of the delivery section will be described. The delivery section 4 is formed by a delivery roller 28 and a spur 29, and the recording sheets P on which images are formed at the recording section 5 are conveyed by the delivery roller 28 and the spur 29 upon being nipped thereby and delivered onto a delivery tray 30.

Referring to FIG. 3 to FIG. 6, the structure of the adhering or attraction force generating means 31 formed at the conveyance belt 15 will be described. The conveyance belt 15 is structured in an endless belt form made of a synthetic resin such as polyethylene or polycarbonate having a thickness of about 0.1 mm to 0.2 mm.

At the conveyance belt 15, the adhering force generating means 31 disposed with electrodes is formed. A center of the adhering force generating means 31 is structured as an adhering force generating area. The adhering force generating means 31 includes conductive metal, comb-shaped electrode plates 32 and ground plates 33, and the electrode plates 32 and the ground plates 33 are arranged alternatingly in a direction perpendicular to the moving direction of the conveyance belt 15. The electrode plates 32 and the ground plates 33 are biased to respective voltages different from each other. The electrode plates 32 and the ground plates 33 have respective voltage receiving portions 32a, 33a having greater widths than the widths of the electrode plates 32 and the ground plates 33 in the moving direction of the conveyance belt 15. The respective voltage receiving portions 32a, 33a are arranged to align with respective edges with respect to the moving direction of the conveyance belt 15.

Voltage supplying brushes 34, 35 as voltage supplying means are provided above the voltage receiving portions 32a, 33a so as to be capable of supplying voltages upon contacting the voltage receiving portions 32a, 33a with a prescribed pressure. Positive or negative voltage is applied to the electrode plates 32 via the voltage supplying brushes 34 and the voltage receiving portions 32a from a high voltage generating apparatus (not shown), while the ground plates 33 are connected to the ground potential via the voltage supplying brushes 35 and the voltage receiving portions 33a. In this embodiment, a voltage of about 0.5 kV to 10 kV is applied to the electrode plates 32, thereby generating an electrostatically adhering or attracting force on the conveyance belt 15 in the recording section below the recording heads 5K, 5C, 5M, 5Y. It is to be noted that the voltage supplying brushes 34, 35 are preferably made of a conductive material having a volume resistivity of $10^{-4}$ to $10^7$ Ωcm.

In this embodiment, a switching control means (not shown) is provided between the high voltage generating apparatus (not shown) and the voltage supplying brushes 34, 35 to control the voltage feeding to the voltage supplying brushes 34, 35.

As shown in FIG. 4, the conveyance belt 15 is so protected that the adhering force generating means formed of the electrode plates 32 and the ground plates 33 made of conductive metal is sandwiched by a base layer 15a and a surface layer 15b. The base layer 15a and surface layer 15b are constituted of a synthetic resin such as polyethylene, polycarbonate, or the like.

When a voltage is applied to the electrode plates 32, electrostatic force is generated in a direction of an arrow shown in FIG. 4, thereby producing electric field lines. From the potential difference between the electrode plates 32 and the ground plates 33, the electrostatic adhering force occurs above the position of the conveyance belt 15, and electric charges (surface charges) of the same polarity as the voltage fed to the electrode plates 33 occur on the recording surface of the recording sheets P.

At that time, since the electric force generated at the electrode plates 32 does not reach the ground plates 33 as a whole, the adhering force generating on the electrodes is stronger on the electrode plates 32 than on the ground plates 33.

Thus, the recording sheet P conveyed by the feeding rotary body 7 is nipped and conveyed by the conveyance roller 12 and the pinch roller 21 on the conveyance belt 15. That is, the front end of the recording sheet P is pressed toward the conveyance belt 15 by the pushing roller 38 at the position above the electrode plate 32 and is introduced into the recording section 5 upon adherence to the flat plane portion of the conveyance belt 15 by means of the adhering force generating means 31. The recording sheet S is then sent in arrow a direction in FIGS. 1, 2, upon rotation of the conveyance belt 15 by the driving roller 16 driven by the conveyance motor 36 while being recorded by the recording heads 5K, 5C, 5M, 5Y.

As shown in FIG. 5, the voltage supplying brushes 34, 35 as voltage supplying means are supported by a supporting member 42. The supporting member 42 is disposed in contact with or adjacent to the conveyance belt 15 and is attached to a protection member 43 covering the entire areas of both edges of the conveyance belt 15 including the voltage receiving portions 32a, 33a.

That is, the protection member 43 is formed cross-sectionally in a letter C shape as to surround the entire periphery of each side of the conveyance belt 15 to protect the voltage receiving portions 32a, 33a of the conveyance belt 15 and the voltage supplying brushes 34, 35 by isolating those from the exterior by having a prescribed space around the periphery of the voltage receiving portions 32a, 33a of the conveyance belt 15 and the voltage supplying brushes 34, 35. The protection member 43 is formed with a sealing member 44 made of an elastomer of low rigidity contacting with the conveyance belt 15 with a prescribed pressure to divide the conveyance belt, with respect to the entire edges, into the adhering force generating area by the adhering force generating means 31 at the central region of the conveyance belt 15 and a non-adhering area of the recording sheet P between the voltage receiving portions 32a, 33a.

As shown in FIG. 6, a support piece 43a is formed at the protection member 43 for supporting the conveyance belt 15 from the bottom of the belt to ensure contact when the voltage supplying brushes 34, 35 press with a prescribed pressure against the voltage receiving portions 32a, 33a. A convex portion 43b is formed on the support piece 43a to reduce wear or fictional force between the lower surface of the conveyance belt 15 and the upper surface of the support piece 43a.

Moreover, a friction reducing means 45 having a low frictional coefficient such as fluorination treatment or the like is formed on the upper surface of the convex portion 43b on the support piece 43a positioned facing the voltage supplying brushes 34, 35 via the conveyance belt 15.

As shown in FIG. 2, the protection member 43 is also formed with a cleaning member 46 for cleaning the voltage receiving portions 32a, 33a to ensure good contact between the voltage receiving portions 32a, 33a and the voltage supplying brushes 34, 35 on an upstream side of the voltage supplying blushes 34, 35 in the moving direction of the conveyance belt 15.

Thus, since the protection member 43 and the sealing member 44 protect the voltage receiving portions 32a, 33a and the voltage supplying brushes 34, 35 by isolating the voltage receiving portions 32a, 33a and the voltage supplying brushes 34, 35 from the exterior and forming a prescribed space around the periphery of the voltage receiving portions 32a, 33a and the voltage supplying brushes 34, 35, inks unexpectedly discharged out of the recording heads 5K, 5C, 5M, 5Y, misted ink droplets (ink mist) made of satellites, micro dots, and the like caused by spraying inks, dusts, paper dusts, and so on, do not encroach the spaces isolated by the protection member 43 and the sealing member 44, so that the voltage receiving portions 32a, 33a and the voltage supplying brushes 34, 35 can be protected as a whole, and stable voltage supply can be realized upon stable contact between the voltage receiving portions 32a, 33a and the voltage supplying brushes 34, 35.

The left side in FIG. 5 indicates a rear side of the apparatus, whereas the right side indicates the front side of the apparatus. The protection member 43 is structured to be capable of contacting with and separating from the conveyance belt 15. The protection member 43 is attached to a chassis 47 as an apparatus body on the rear side of the apparatus (the left side in FIG. 5) and is attached to a jamming treatment door 48 which opens and closes with respect to the chassis 47 when paper jamming of the recording sheets P is to be corrected through the front side of the apparatus (the right side in FIG. 5).

The jamming treatment door 48 is attached pivotally to the chassis 47 around a shaft 49 as a center, and when paper jamming of the recording sheets P occurs, a handle 48a is gripped to move pivotally the jamming treatment door 48 around the shaft 49 to open the door, and at that time, the voltage receiving portions 32a, 33a and the voltage supplying brushes 34, 35 are disengaged from each other as the protection member 43 is removed from the conveyance belt 15. This operation facilitates the jamming recovery of the jammed recording sheets P on the upper surface of the conveyance belt 15.

After the jamming treatment of the recording sheets P, the jamming treatment door 48 is rotated around the shaft 49 to close the door, and the protection member 43 again covers the side edge of the conveyance belt 15. The sealing member 44 is in contact with the conveyance belt 15, and the voltage supplying brushes 34, 35 come in contact with the voltage receiving portions 34, 35.

Although this embodiment exemplifies an example in which the jamming treatment door 48 is structured to open and close upon pivotal movement around the shaft 49, as one alternative example, the apparatus may have a structure that the protection member 43 is installed on a jamming treatment door that is detachable from the apparatus body, and when the jamming treatment door is separated from the apparatus body the protection member 43 is spaced from the conveyance belt 15 as well, so that the voltage supplying brushes 34, 35 are separated from the voltage receiving portions 32a, 33a.

According to the above structure, the conveyance belt 15 adhering and holding the recording sheets P does not have any portion projecting on a side of the recording heads 5K, 5C, 5M, 5Y during recording for the front end and the rear end of the recording sheet P, so that the projecting nozzles located at edges of the recording heads 5K, 5C, 5M, 5Y and the edge of the recording sheets P can make recording upon coming closer to each other, and so that image recording can be obtained with high accuracy.

When inks are ejected in a large amount on the recording sheets P, the recording sheets P may be expanded or subject to waving (cockle). In such a situation, because the recording sheets P are attracted toward the conveyance belt 15 by the attracting force of the attracting force generating means 31, the recording sheets P do not float toward the side of the recording heads 5K, 5C, 5M, 5Y, so that the recording heads 5K, 5C, 5M, 5Y do not contact the recording sheets P, and stable recording can be effected.

Even where the edges of the recording sheets P become subject to waving or curling due to environmental changes such as temperature, humidity, or the like, the pushing roller 38 pushes the recording sheets P toward the conveyance belt 15 and can send the recording sheets P to the attraction force generating section where cockling or curling is removed, so that the recording section 5 can hold the recording sheets stably.

In this embodiment, the voltage supplying brushes 34, 35 are used as voltage supplying means to give charges to the attraction force generating means 31, and other voltage supplying means usable are a contact type using a roller or a non-contact type using a thin plate such as stainless steel (SUS) or the like having a shaped tip.

As shown in FIG. 3, marks 15c are provided with a prescribed pitch for serving as an encoder on the surface of both sides of the conveyance belt 15. As for the pitch, e.g., $\frac{1}{180}$ (one hundred eightieth inch), $\frac{1}{360}$ (three hundred sixtieth inch), or the like are applicable.

Marks 15c can be accumulated by counting signals from sensors (not shown) by means of a detecting means (not shown) and a count amount to stop the recording sheets P at a predetermined position can be preset. When it reaches the preset count amount, the apparatus stops the drive of the conveyance belt 15.

It is to be noted that the marks 15c may be white when the conveyance belt 15 is black and black when the conveyance belt 15 is white, and other combinations can be used. The material of the mark 15c is not specifically limited as long as the mark 15c is securely attached to the surface of the conveyance belt 15. The mark 15c can be provided on a lower surface (bottom surface) of the conveyance belt 15 and may be read from the lower surface (bottom surface). The mark 15c may be formed by holes placed with a prescribed pitch in the conveyance belt 15 instead of identification marks attached to the conveyance belt 15.

Next, referring to FIG. 7 and FIG. 8, the second embodiment of the sheet conveying apparatus according to the invention will be described. It is to be noted that the same reference numbers are assigned to members having the same functions as those in the above embodiment, and descriptions of such members are omitted.

In this embodiment, as shown in FIGS. 7 and 8, the voltage receiving portions 32a, 33a electrically connected to the electrode plates 32 and the ground plates 33 of the conveyance belt 15 serving as the adhering force generating means 31 are provided on a lower surface (bottom surface) of the conveyance belt 15, and the voltage supplying brushes 34, 35 capable of contacting the voltage receiving portions 32a, 33a are installed on the protection member 43 on a side of the lower surface (bottom surface) of the conveyance belt 15.

Projections 43c of the protection member 43 are formed at positions corresponding to the voltage supplying brushes 34, 35 via the conveyance belt 15 on a side of the upper surface of the conveyance belt 15. A convex portion 43b is formed at a lower end of each projection 43c. Friction reducing means 45 for reducing wear and frictional force when the upper surface of the conveyance belt 15 and the lower surface of the convex portion 43b are rubbed against each other is formed on a lower surface side of the convex portion 43b.

According to the above structure, the number of structural parts on a side of the upper surface of the conveyance belt 15 is reduced, and the apparatus can easily recover from paper jamming of the recording sheets P. Other structures are formed in substantially the same way as those in the first embodiment, and substantially the same effects can be obtained.

Next, referring to FIGS. 9 and 10, the third embodiment of the sheet conveying apparatus according to the invention is described. It is to be noted that the same reference numerals are assigned to members having the same functions as those in the above embodiment, and descriptions of such members are omitted.

In this embodiment, the voltage receiving portions 32a, 33a electrically connected to the electrode plates 32 and the ground plates 33 serving as the adhering force generating means 31 are provided in line on one edge with respect to the moving direction of the conveyance belt 15, and the voltage supplying brushes 34, 35 capable of contacting with the voltage receiving portions 32a, 33a are provided in line on one edge with respect to the moving direction of the conveyance belt 15.

Support pieces 43a of the protection member 43 for supporting the lower surface of the conveyance belt 15 extend to a greater degree. Convex portions 43b placed at two positions are arranged in line on an upper surface of the support piece 43a to contact adequately with the voltage receiving portions 32a, 33a and the voltage supplying brushes 34, 35, and the friction reducing means 45 is formed on the upper surface of the convex portion 43b.

According to this structure, it is advantageous when an ink supplying means for supplying ink to the recording heads 5K, 5C, 5M, 5Y, and pumps, pipes, and tubes of a recovering means are not placed in a limited space on the rear side of the apparatus. Only a single protection member 43 is needed, and a mechanism of the voltage supplying brushes 34, 35 for supporting the support member 42 can be a simple structure provided on only a single side of the conveyance belt 15, so that the interconnections of electrical cables to the voltage supplying brushes 34, 35 can be simplified. Furthermore, only one protection member 43 is manipulated during jamming recovery work of the recording sheet P, so that such recovery can be easily performed.

Furthermore, the ink-jet recording apparatus mentioned above can be incorporated in a photocopier combined with a reader, or a facsimile machine with a transmitting and receiving function in addition to the apparatus used as an image output terminal apparatus for information processing equipment such as computers or the like.

Although in this embodiment the example employing an ink-jet recording method is described, the invention is not limited to such an ink-jet recording method and is applicable to a thermal transfer recording method, a thermal recording method, an impact recording method such as a wire-dot recording method, and other recording methods. This invention is not limited to the line recording method, and can employ a so-called serial recording method.

This invention, because of having the above structure and operation, can protect the entire voltage supplying portions from inks unexpectedly discharged from the recording heads, misted ink droplets (ink mist) made of satellites, micro dots, and the like caused by spraying inks, dusts, paper dusts, and so on where the entire edges of the conveyance belt to which the voltage supplying portions are formed are covered by the protection member to isolate from the exterior, and the voltage supplying portions and the voltage supplying means are surely contacted to make voltage feeding stable.

In addition, if the voltage supplying means is installed on the protection member, the protection member can isolate the voltage supplying means.

What is claimed is:

1. A sheet conveying apparatus comprising:
   a conveyance belt for supporting and conveying a sheet;
   attraction force generating means formed in the conveyance belt and comprising electrodes for electrostatically attracting the sheet, the electrodes comprising voltage receiving portions formed at a side edge with respect to a moving direction of the conveyance belt;
   supplying means for supplying voltage to the voltage receiving portions; and
   a protection member provided at the side edge with respect to a moving direction of the conveyance belt for isolating the voltage receiving portions and said supplying means from an exterior by covering the voltage receiving portions and the supplying means.

2. The sheet conveying apparatus according to claim 1, wherein the electrodes of the attraction force generating means comprise electrode plates and ground plates for receiving voltages different from one another, wherein the electrode plates and the ground plates are arranged alternatingly, wherein the voltage receiving portions of the electrode plates and the ground plates are disposed on the opposite edges of the conveyance belt with respect to the moving direction of the conveyance belt, and wherein the protection member is formed on each edge of the conveyance belt.

3. The sheet conveying apparatus according to claim 1, wherein the electrodes of the attraction force generating means comprise electrode plates and ground plates for receiving voltages different from one another, wherein the electrode plates and the ground plates are arranged alternatingly, wherein the voltage receiving portions of the electrode plates and the ground plates are disposed on one edge of the conveyance belt with respect to the moving direction of the conveyance belt, and wherein the protection member is formed on the one edge of the conveyance belt at which the voltage receiving portions are disposed.

4. The sheet conveying apparatus according to claim 2 or claim 3, wherein the electrode plates and the ground plates, which are in a strip shape, are arranged alternatingly and in a comb shape with their lengths running in a direction perpendicular to the moving direction of the conveyance belt.

5. The sheet conveying apparatus according to claim 1, claim 2, or claim 3, further comprising a sealing member attached to the protection member for sealing a space between the protection member and the conveyance belt by contacting wit h an upper surface of the conveyance belt.

6. The sheet conveying apparatus according to claim 1, claim 2, or claim 3, wherein the voltage supplying means is supported by the protection member.

7. The sheet conveying apparatus according to claim 6, wherein the protection member comprises a support for supporting the conveyance belt at a position facing the voltage supplying means through the conveyance belt.

8. The sheet conveying apparatus according to claim 7, wherein the support of the protection member is formed in a convex shape, and wherein function reducing means is provided between the support and the conveyance belt.

9. The sheet conveying apparatus according to claim 1, claim 2, or claim 3, further comprising a cleaning member, in contact with the conveyance belt, for cleaning the voltage receiving portion of the attracting force generating means at an upstream side of the voltage supplying means in the moving direction of the conveyance belt.

10. The sheet conveying apparatus according to claim 1, claim 2, or claim 3, wherein the protection member detachably contacts the conveyance belt.

11. The sheet conveying apparatus according to claim 10, wherein the protection member is attached to a door openable or detachable during paper jamming treatments of a jammed sheet and the protection member is contacted with and separated from the conveyance belt in association with movement of the door.

12. The sheet conveying apparatus according to claim 1, claim 2, or claim 3, wherein the conveyance belt is wound around at least a drive roller and a driven roller and tensioned by at least one pressure roller.

13. A sheet conveying apparatus according to claim 1, wherein the protection member covers the entire side edge of the conveyance belt.

14. A recording apparatus for recording images with a recording head, comprising:

a recording head mounting member which mounts the recording head;

a conveyance belt for supporting and conveying a sheet;

attraction force generating means formed in the conveyance belt and comprising electrodes for electrostatically attracting the sheet, the electrodes comprising voltage receiving portions formed at a side edge with respect to a moving direction of the conveyange belt;

supplying means for supplying voltage to the voltage receiving portions; and a protection member provided at a side edge with respect to a moving direction of the conveyance belt for isolating the voltage receiving portions and said supplying means from an exterior by covering the voltage receiving portions and the supplying means.

15. The recording apparatus according to claim 14, wherein the recording head discharges droplets of ink from an orifice to effect recording on the sheet.

16. The recording apparatus according to claim 14, further comprising plural recording heads in the moving direction of the conveyance belt and so arranged that orifices of the recording heads are aligned in directions perpendicular to the moving direction of the conveyance belt.

17. The recording apparatus according to claim 14, wherein the recording head is a full line type recording head in which plural recording elements are arranged across the entire width of a recording area of the sheet.

18. The recording apparatus according to claim 15, claim 16, or claim 17, wherein the recording head discharges ink from the orifice utilizing film boiling occurring in the ink by thermal energy applied by an electrothermal converter.

19. The recording apparatus according to claim 14, wherein the protection member covers the entire side edge of the conveyance belt.

\* \* \* \* \*

UNITED STATES PATENT AND TRADEMARK OFFICE
CERTIFICATE OF CORRECTION

PATENT NO.    : 6,419,411 B1
DATED         : July 16, 2002
INVENTOR(S)   : Tanno It is certified that error appears in the above-identified patent and that said Letters Patent is hereby corrected as shown below:

Column 5,
Line 17, "full line" should read -- full-line --.

Column 7,
Line 65, "full line, type" should read -- full-line type --.

Column 8,
Line 41, "above mentioned" should read -- above-mentioned --.

Column 10,
Line 41, "fictional" should read -- frictional --.

Column 14,
Line 47, "wit h" should read -- with --.

Column 15,
Line 23, "conveyange" should read -- conveyance --.

Column 16,
Line 14, "full line" should read -- full-line --.

Signed and Sealed this

Fourth Day of February, 2003

JAMES E. ROGAN
*Director of the United States Patent and Trademark Office*